Nov. 15, 1955                H. E. R. GRUNER                2,723,593
            TILTABLE LENS MOUNT FOR PHOTOGRAMMETRIC
                       PROJECTION APPARATUS
                       Filed July 19, 1954
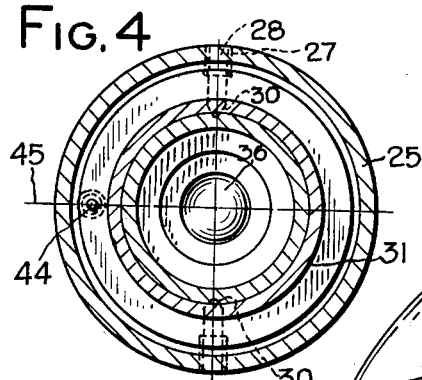
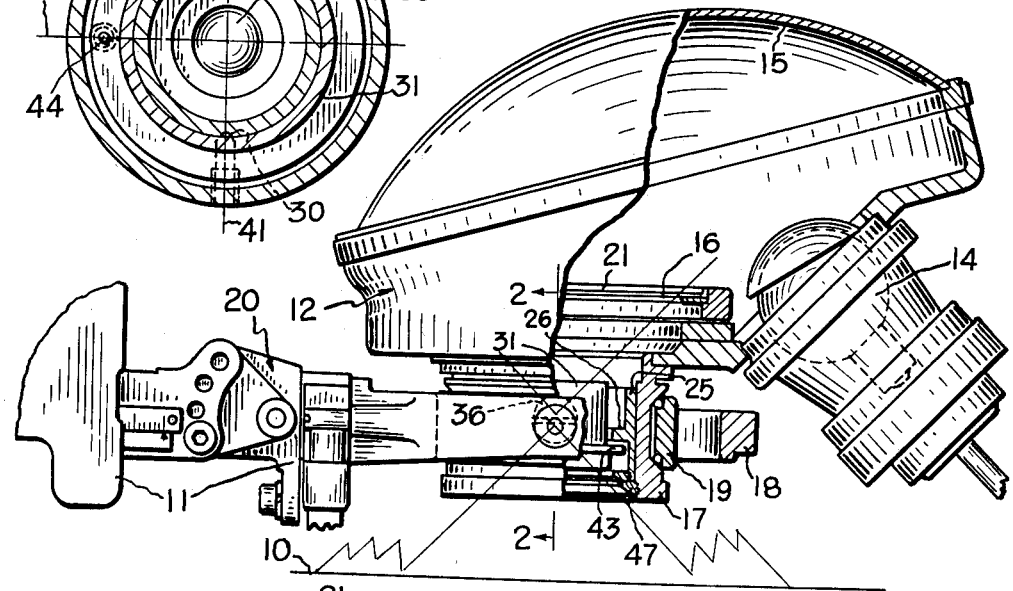
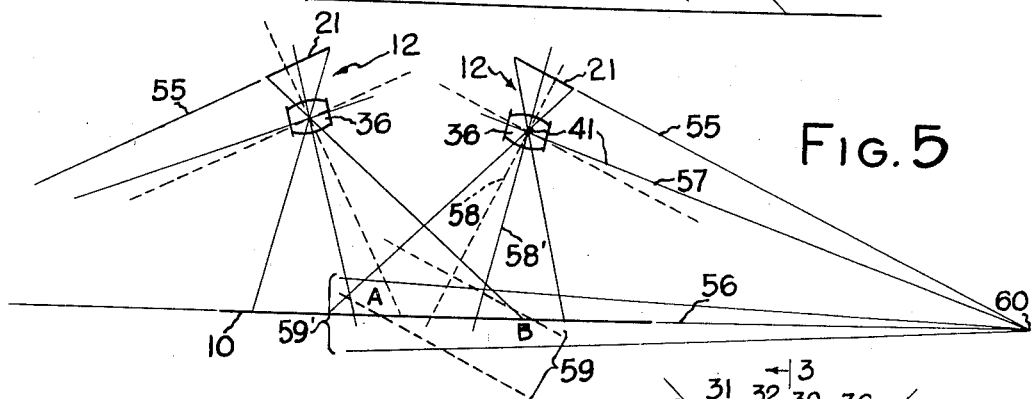
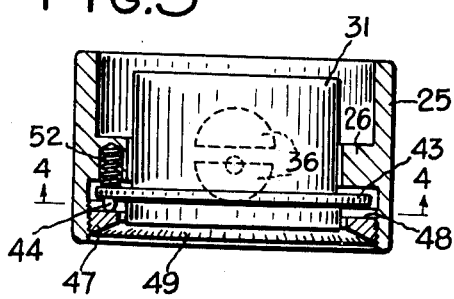
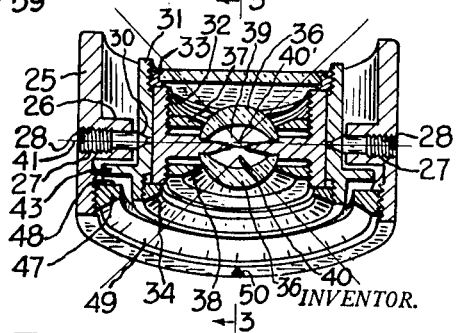
INVENTOR.
HEINZ E. R. GRUNER
BY
ATTORNEYS

United States Patent Office 2,723,593
Patented Nov. 15, 1955

2,723,593

TILTABLE LENS MOUNT FOR PHOTOGRAMMETRIC PROJECTION APPARATUS

Heinz E. R. Gruner, Irondequoit, N. Y., assignor to Bausch & Lomb Optical Company, Rochester, N. Y., a corporation of New York Application July 19, 1954, Serial No. 443,999

5 Claims. (Cl. 88—24)

This invention relates to improvements in photogrammetric apparatus and more particularly to projectors and lens tilting mechanisms therefor.

In the usual form of aerial mapping projection there is an object plane (containing a diapositive), an image plane (mapping surface) and a plane passing normal to the optical axis of the projection lens through a nodal or perspective center of the lens. When these three planes meet along a common line, either at infinity or at a finite distance, the depth of focus zone of the system will be oriented approximately parallel to the image plane so that an image in the image plane within the depth of focus zone will be in focus. The above-described condition is known in the photogrammetric art as the Scheimpflug principle. The depth of focus zone is a zone lying between two limiting planes, one above and one below the image plane, which theoretically meet either at infinity or at the common line of intersection of the image plane, object plane and lens plane whereby a projected image falling within this zone will be in focus.

In normal projection, the object plane, the image plane and the plane normal to the axis of the lens through one of the perspective centers of the lens are all parallel to each other so that the projected images will fall within the depth of focus zone and will thereafter be clearly defined.

However, in oblique projection, where the negatives have been taken at an angle to the surface being photographed, the lens plane, object plane and the planes of the depth of focus zone are parallel and cross the plane of projection (mapping surface) obliquely so that only a relatively small portion of the projected image is in focus on the mapping surface. The usual way to increase the area of focus is to stop down the lens, but this is a very limited means since the stopping down process tends to reduce the resolution of the projected image. The scientifically correct way to increase the area of acceptable focus is to satisfy the conditions of the Scheimpflug principle, namely, tilt the object plane, and/or the image plane, and/or the plane through the perspective center of the lens and normal to its axis until the planes intersect along a predetermined common line. At this point the depth of focus planes are substantially parallel to the image plane so that the entire projection field in the image plane will be in focus. Successful attempts have been made to adjust the tilt of the object plane and image plane to take advantage of the Scheimpflug principle. However, the devices proposed to adjust or fix the tilt of the lens plane are unduly complicated, are subject to accidental misalignment and are generally inefficient for one reason or another.

It is therefore an object of this invention to provide an improved projection apparatus for aerial mapping to overcome the disadvantages of the known prior devices.

It is another object of this invention to provide an improved projection apparatus having a novel mechanism for adjusting the optical plane of the lens to correct for the inclination of the diapositive.

It is still another object of this invention to provide an improved projection apparatus having a mechanism by which the degree and direction of lens tilt can be chosen at the discretion of the operator.

It is a further object of this invention to provide an improved projection apparatus having an adjusting mechanism which will be protected against accidental misalignment thereof.

It is a still further object of this invention to provide an improved lens tilting means for a projection apparatus which is relatively simple in structure yet positive and efficient in operation.

These and other objects and advantages reside in certain novel features of construction, arrangement and combination of parts as will hereinafter be more fully explained and pointed out in the appended claims.

Referring to the drawings:

Fig. 1 is a side elevational view of a projector embodying the present invention with parts in section.

Fig. 2 is a view of the lens mounting taken on the line 2—2 in Fig. 1.

Fig. 3 is a partial section of the lens mounting taken on the line 3—3 in Fig. 2.

Fig. 4 is a sectional view taken along the line 4—4 in Fig. 3.

Fig. 5 is a diagrammatic showing of the principle involved in this invention.

One embodiment of the present invention is illustrated in the drawings wherein 10 designates a reference surface such as a drawing board. A projector supporting frame 11 extends above the drawing board and has a pair of projection units 12 mounted thereon for universal movement relative to said drawing board.

Since the two projection units or projectors 12 required by the invention, see Fig. 5, are identical in structure, only one will be described. Said projector 12, having a light source 14, a dome-shaped reflector 15, and a diapositive supporting surface 16, has a casing 17 mounted in a yoke 18 and bearing ring 19 in such a manner that the adjustments available therewith, together with the adjustments afforded by the conventional universal connection 20 permits the diapositive 21, supported on surface 16 in the projection unit 12, to be rotated and tilted through a wide range of angles.

Referring specifically to Figs. 2 and 3, my invention comprises a cylindrical housing 25 having an integrally formed concentric lug 26 radially extending from the inner wall thereof. A pair of aligned holes 27 are tapped through the housing 25 and lug 26 for receiving a pair of aligned pivot pins 28. The inner ends of said pivot pins 28 engage in a pair of detents 30 formed in the outer wall of a lens barrel 31 which has a lens support element 32 fastened therein by means of threaded collars 33, 34. A lens 36 is fastened in the support element 32 by collars 37, 38 so that an aperture 39 in the element 32 is centered relative to the lens 36. The lens 36 shown in the drawing is a common type of thick lens having two nodal points 40', 40, sometimes called the interior and exterior perspective centers, respectively. It is imperative, for the successful operation of this device, that a horizontal axis 41 pass not only through the pivot pins 28, but also through one of the perspective centers 40, 40' of the lens 36. In Fig. 2 the axis 41 passes through the interior perspective center 40' so that the lens barrel 31 and lens 36 are free to pivot about the axis 41.

Formed integrally with and extending outwardly from the lower portion of the lens barrel 31 is a flange 43 which has a finger 44 projecting downwardly from the lower face thereof and lying in a vertical plane which is perpendicular to the axis 41 of the pivot pins 28.

The lower internal portion of the cylindrical housing 25 is threaded for receiving an externally threaded concentric adjusting ring 47 which has on its upper side a flat bearing surface 48 and on its lower side a beveled portion upon which graduated indicia 49 is engraved. A fixed fiducial mark 50 is engraved on the cylindrical housing 25, said mark 50 being used in conjunction with the indicia 49. Mounted above the flange 43, in overlying relationship with the finger 44, is a resilient means or spring 52 which is seated in a recess formed in the under surface of the lug 26 of the housing 25 for urging the finger 44 continually into contact with the flat bearing surface 48 of the adjusting ring 47. Although the embodiment illustrated shows the finger 44 and spring 52 aligned on the same vertical axis, it is to be understood that any resilient means acting on the lens barrel 31 for forcing the finger 44 always into contact with the surface 48 of the adjusting ring 47 is to be considered within the scope of this invention.

From the foregoing, it is obvious that turning the adjusting ring 47 into or out of the lower portion of the cylindrical housing 25 will raise or lower the side of the lens barrel 31 upon which the finger 44 is mounted to thereby cant or tilt the lens 36 and lens barrel 31 about the axis 41 which passes through the perspective center 40'. The adjusting ring 47 is enclosed within the confines of housing 25, out of the normal sphere of active adjustments for other operations on the instrument so that accidental misalignment thereof is prevented.

Referring specifically to Fig. 5, a diapositive or negative 21 lies in an object plane 55 of each projector 12. A drawing board or positive 10 lies in the image plane 56 in optical alignment with each projector 12 so that images projected from the two diapositives 21 will form a stereoscopic positive to be plotted according to usual photogrammetric means. Between the object planes 55 and image plane 56 are mounted the lenses 36, each lens 36 having a plane 57 which lies perpendicular to the optical axis of the lens 36 and contains the axis 41 through the internal perspective center 40 thereof. With the lens 36 untilted, the optical axis 58 thereof will be in the position shown in dotted lines with the depth of focus zone 59, also shown in dotted lines, oriented as shown. In this untilted position of the lens, the only area on the mapping surface in focus will lie between points A and B.

By tilting the lens 36 so that the optical axis will be in the solid line position 58', according to the teaching of Scheimpflug, the object plane 55, image plane 56 and the plane 57 of the lens will intersect in a line 60 so that the depth of focus zone 59', shown in solid lines, will be oriented substantially parallel to the image plane 56 whereby each point in said image plane 56 will be in focus. The axis of tilt 41 of the lens will always lie parallel to the common line of intersection 60 of the three planes.

The angle of the object plane 55 relative to the image plane 56 is determined by the angle of the taking camera with respect to the terrain originally photographed. Since convergent photography is frequently performed at an angle of 20° and since the angle of tilt is substantially the same for the same angle of convergent photography, one of the graduations 49 on the adjusting ring 47 is used for tilting the lens to correct for this 20° angle. The remaining graduations 49 are for other common and uncommon angular settings.

The magnitude of the angle of tilt is determined either empirically or mathematically, so that after the angle of the diapositive plane is set in the projector, the adjusting ring 47 is turned in the housing 25 until the proper angle of lens tilt has been set. Thereafter, the plotting of the resulting stereoscopic image is proceeded with in the usual manner.

From the foregoing, it will be apparent that I am able to attain the objects of my invention and provide improved projection apparatus for aerial mapping devices. Effective means are provided for efficiently and precisely tilting the plane of the lens. The mounting of my adjusting ring is such that it is inconspicuous and out of the way so as not to be easily put out of adjustment. The invention is simple in structure yet positive and efficient in operation, all of these features being in accordance with the objects of the invention. Various modifications may obviously be made without departing from the spirit of my invention as pointed out in the appended claims.

I claim:

1. In a photogrammetric projection apparatus the combination of a frame, a projector mounted on said frame, means for supporting a diapositive in said projector, a cylindrical housing carried by the lower portion of the projector, an internally threaded portion on the lower end of said housing, a lens barrel mounted within said housing to tilt about a horizontal axis, a lens in said barrel, means for tilting said barrel and lens about said axis comprising a ring threaded into the threaded portion of the housing and concentric therewith adjacent the lower end of the lens barrel, means projecting downwardly from the lens barrel on one side of said axis, and resilient means for normally holding the last-named means in engagement with the upper face of the ring whereby turning the ring in the housing will tilt the lens about said horizontal axis.

2. In a photogrammetric projection apparatus having a frame, a projector carried by said frame, means for supporting a diapositive in said projector, and a lens adjusting mechanism carried by the lower portion of said projector, the combination of means for tiltably mounting the lens relative to the diapositive comprising a cylindrical housing carried by the lower portion of the projector, a lens barrel carrying a lens, a pair of pivot pins extending between the housing and the lens barrel along a horizontal axis for tiltably mounting the lens and barrel, means for tilting the lens and barrel about said axis comprising an adjusting ring threadedly mounted on the lower portion of the housing and concentric therewith below the lens barrel, means projecting downwardly from the lens barrel in a vertical plane which is perpendicular to the axis of the pins, and resilient means for normally holding the last-named means in engagement with the adjusting ring whereby turning the ring in the housing will tilt the lens relative to the diapositive about said horizontal axis.

3. In a photogrammetric projection apparatus the combination of a frame, a projector mounted on said frame, means for supporting a diapositive in said projector, a cylindrical housing carried by the lower portion of the projector substantially in alignment with the diapositive, a lens barrel carrying a lens, means for tiltably mounting the lens and barrel within the housing comprising a pair of pivot pins extending inwardly from the inner wall of the cylindrical housing along a common axis, said pins engaging in a pair of detents formed in the outer wall of the lens barrel, the axis of said pivot pins passing through a perspective center of said lens, means for tilting the lens and barrel comprising a finger carried by the lower face of the lens barrel and lying in a vertical plane which is perpendicular to the axis of the pins, an adjusting ring threaded into the lower portion of the housing for engagement with said finger, and resilient means for normally holding the finger in engagement with the adjusting ring whereby turning the ring in the housing will tilt the lens about the axis passing through said perspective center of the lens.

4. In a lens tilting device for a projection apparatus the combination of a cylindrical housing having an internally threaded portion on one end thereof, a lens barrel mounted within said housing with its axis parallel to the axis of the housing and mounted to tilt about an axis normal to the first named axis, a lens in said barrel, means for tilting said lens and barrel about said second named axis comprising a ring threaded into the threaded portion of the housing and concentric therewith adjacent one end of the lens barrel, and coacting means on the adjacent ends of the lens barrel and ring on one side of said second named axis whereby rotating the ring in the housing will cause the coacting means to tilt the lens about said second named axis.

5. In a lens tilting device for a projection apparatus the combination of a cylindrical housing with its axis lying in a vertical plane, said housing having an internally threaded portion on one end thereof, a lens barrel mounted within said housing with its axis parallel to the axis of the housing and mounted to tilt about a horizontal axis, a lens in said barrel, means for tilting said barrel and lens about said horizontal axis comprising a ring threaded into the threaded portion of the housing and concentric therewith adjacent one end of the lens barrel, and coacting means on the adjacent ends of the lens barrel and ring acting along a plane substantially perpendicular to said horizontal axis whereby turning the ring in the housing will move the ring axially thereof and cause the lens to tilt about said horizontal axis.

References Cited in the file of this patent

UNITED STATES PATENTS

| | | |
|---|---|---|
| 1,910,425 | Cahill | May 23, 1933 |
| 1,980,657 | Bauersfeld | Nov. 13, 1934 |
| 1,980,981 | Cooke | Nov. 20, 1934 |
| 2,079,090 | Von Gruber | May 4, 1937 |
| 2,164,847 | Trautmann | July 4, 1939 |
| 2,200,594 | Diggins et al. | May 14, 1940 |
| 2,263,341 | Kurtz | Nov. 18, 1941 |
| 2,285,768 | Drucker | June 9, 1942 |
| 2,552,975 | Kelsh | May 15, 1951 |